June 2, 1936.      H. F. RICHARDSON      2,042,633
OUTLET
Filed May 24, 1933      3 Sheets-Sheet 1
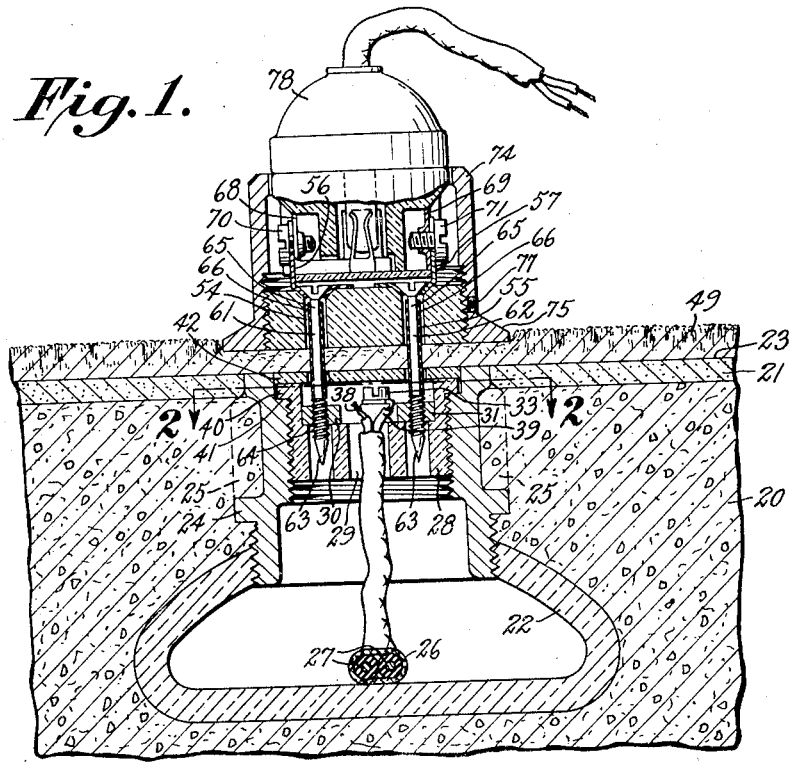
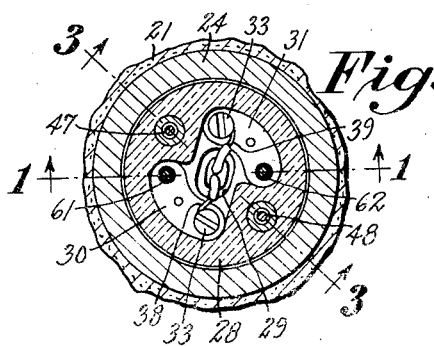
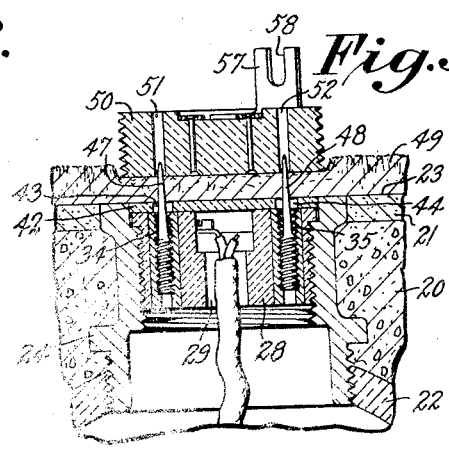
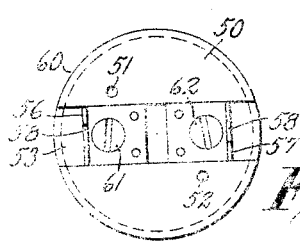
INVENTOR
HENRY FERGUSON RICHARDSON
BY
William G. McKnight.
ATTORNEY June 2, 1936.  H. F. RICHARDSON  2,042,633
OUTLET
Filed May 24, 1933  3 Sheets-Sheet 2
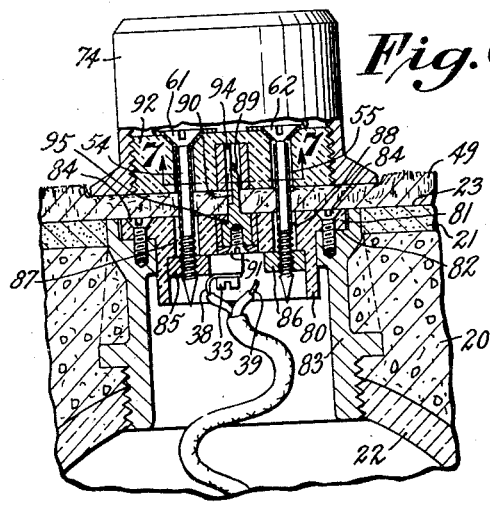
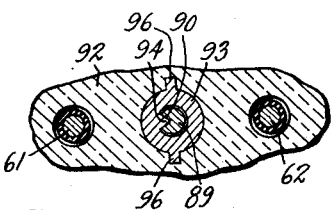
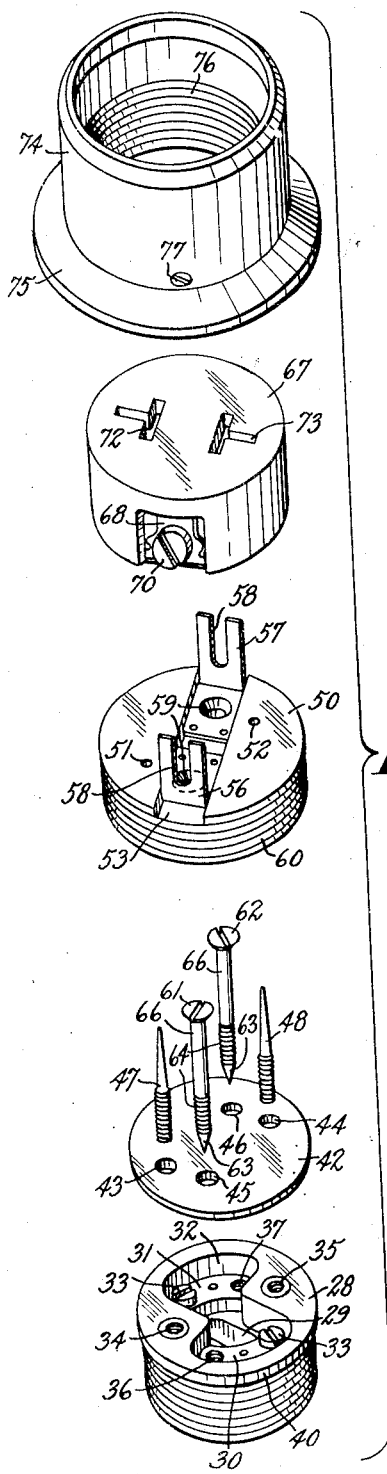
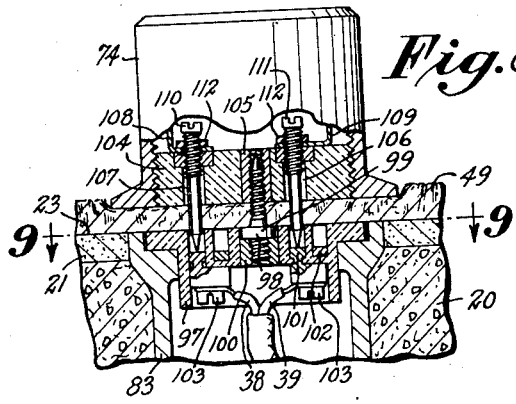
INVENTOR
HENRY FERGUSON RICHARDSON
BY
William Knight
ATTORNEY June 2, 1936.  H. F. RICHARDSON  2,042,633
OUTLET
Filed May 24, 1933  3 Sheets-Sheet 3
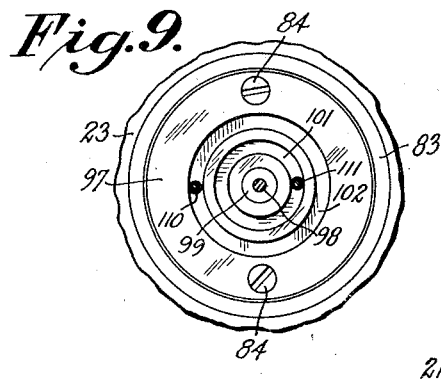
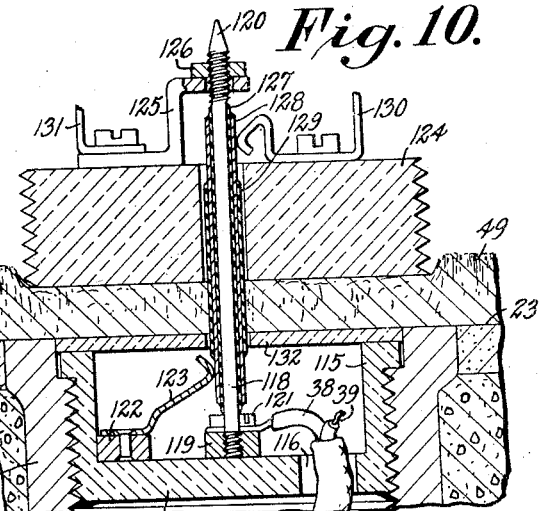
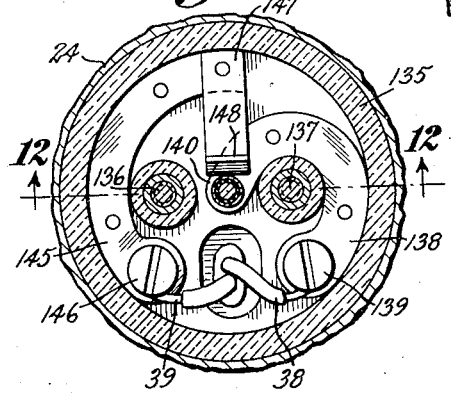
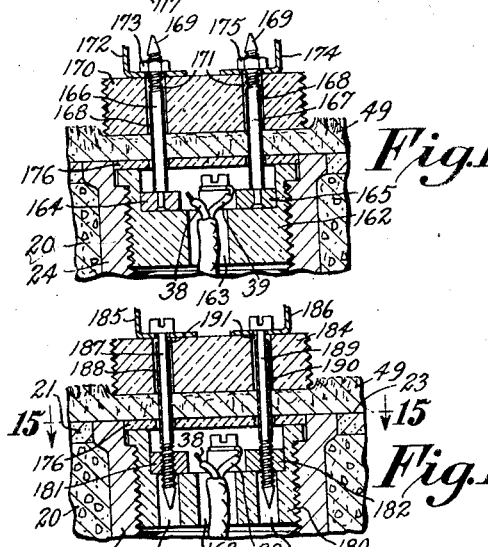
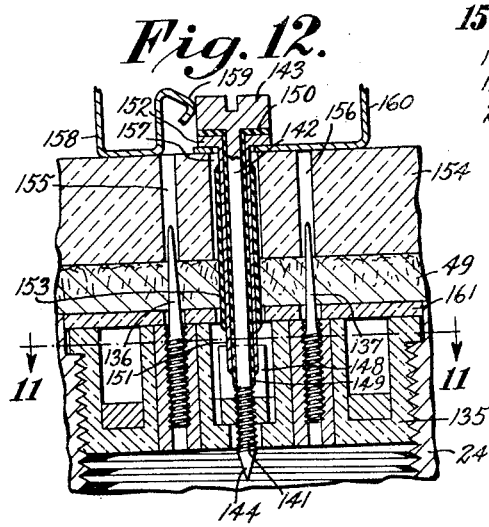
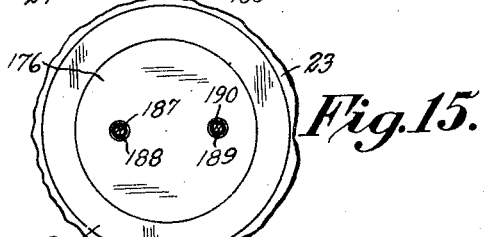
INVENTOR
HENRY FERGUSON RICHARDSON
BY
ATTORNEY Patented June 2, 1936

2,042,633

UNITED STATES PATENT OFFICE 2,042,633

OUTLET

Henry Ferguson Richardson, Northport, N. Y., assignor to Allan Coggeshall and Henry F. Richardson, trustees Application May 24, 1933, Serial No. 672,523

13 Claims. (Cl. 173—330)

This invention relates to electrical conductors and connections and more particularly pertains to outlets for underfloor electric wiring conduit, or duct systems.

In systems of this character, the electrical conductors are generally enclosed in raceways of impregnated fibre or other material disposed below the floor level, and the apparatus or equipment to which electricity is to be supplied is connected to these electrical conductors at convenient points through, or by means of, outlets which are ordinarily connected to the raceways and extend upwardly through the floor and above the level thereof. When the floor is covered with woven coverings, such as rugs or carpeting, it has heretofore been necessary to cut or bind or otherwise more or less permanently injure the covering to permit the outlets now in use to pass therethrough.

The present invention provides a novel outlet for an underfloor electric wiring conduit or duct system which permits current to be transmitted through a woven floor covering from the underfloor system to the electrical equipment without injury to the covering. In the preferred forms of the invention herein disclosed, means are also provided in conjunction with the outlet for accurately locating the electrical contacts underneath the floor and covering, so that they may be readily connected with the terminals to be disposed above the floor level, but such locating means may be dispensed with under some circumstances, if desired.

The nature of the invention will be understood from the following detailed description when considered in connection with the accompanying drawings, forming a part thereof, and in which:

Fig. 1 is a vertical sectional view of a duct of an underfloor system and an outlet therefor embodying the invention;

Fig. 2 is a transverse sectional view taken substantially on line 2—2 of Fig. 1;

Fig. 3 is a vertical sectional view taken substantially on line 3—3 of Fig. 2;

Fig. 4 is a plan view of the upper terminal block shown in Figs. 1 to 3;

Fig. 5 is an exploded view of the principal parts of the outlet shown in Figs. 1 to 4 inclusive;

Fig. 6 is a vertical sectional view of another form of the invention;

Fig. 7 is a transverse, partial sectional view taken substantially on line 7—7 of Fig. 6;

Fig. 8 is a vertical sectional view of another form of the invention;

Fig. 9 is a sectional view taken substantially on line 9—9 of Fig. 8;

Fig. 10 is a vertical sectional view of a further form of the invention;

Figs. 11 and 12 are sectional views of another form of the invention, Fig. 11 being taken substantially on line 11—11 of Fig. 12 and Fig. 12 being taken substantially on line 12—12 of Fig. 11;

Figs. 13 and 14 are vertical sectional views of further forms of the invention; and Fig. 15 is a transverse sectional view taken substantially on line 15—15 of Fig. 14.

Like characters of reference refer to like parts throughout the several views of the drawings.

Referring to the embodiment of the invention illustrated in Figs. 1 to 5 inclusive of the drawings, reference character 20 designates a section of flooring of concrete or other material having an upper, relatively thin layer 21 of cement or other material. A conduit or duct 22 of generally oval shape, and forming part of an underfloor wiring system, well known in the art, is embedded in the concrete 20 at a suitable distance below the floor level 23. The duct 22 may be of impregnated fibre or other material and may be of any configuration or construction, other than that shown. An adjustable insert or housing 24 provided with hexagonal or flattened sides 25 to facilitate the gripping and turning thereof by suitable tools, is threaded in the upper wall of the duct 22 until the upper surface of the insert is flush or approximately flush with the floor level 23. As shown in Fig. 1, duct 22 carries a cable 26 having two conductors 27, but any desired number of cables having any suitable number of conductors may obviously be carried by the duct 22 and the underfloor system 1.

A lower terminal block 28, of suitable insulating material is threaded into the upper end of the insert 24, and is provided with a central aperture 29, two metallic terminals 30 and 31 secured to the block 28 at the bottom and at opposite sides of a recess 32 in block 28 by screws 33, and internally threaded sockets 34 and 35 disposed preferably at diametrically opposite points in the terminal block and parallel to the axis thereof with the upper ends of the sockets flush with the upper surface of the block. The terminals 30 and 31 are provided with threaded apertures 36 and 37 respectively, and are electrically connected to the conductors 27 of the cable 26 by wires 38 and 39 by means of the screws 33. Block 28 is provided with an annular flange 40, the lower surface of which is adapted to bear against an internal annular flange 41 of the insert 24. A circular disc 42 of fibrous or other insulating material is disposed over the terminal block 28 and the latter is threaded into the insert 24 to an extent sufficient to permit the upper surface of the disc 42 to be flush with the floor level 23. Disc 42 is provided with apertures 43 and 44 which are adapted to register with the sockets 34 and 35 and also with apertures 45 and 46 which register with the apertures 36 and 37 in the terminals 30 and 31. Dowels 47 and 48 having their lower ends threaded and their upper ends tapered, as clearly shown in the drawings, are threaded into the sockets 34 and 35 respectively, in the lower terminal block 28. These dowels may be threaded into the sockets to any desired extent and it is their function to pierce the woven floor covering 49 and to extend above the pile thereof when the covering is laid on the floor and to accurately locate the terminals 30 and 31 and particularly the apertures 36 and 37 therein, as will presently appear.

An upper terminal block 50, preferably of insulating material and of cylindrical form with a diameter approximately the same or slightly larger than the diameter of the lower terminal block 28, is provided with opposed apertures 51 and 52 which are large enough to receive the upper tapered ends of the dowels 47 and 48. Block 50, as shown, is provided with a diametral slot 53 in the upper surface thereof and with apertures 54 and 55 which are adapted to register with the apertures 36 and 37 respectively of the lower terminal block 28 when the outlet is assembled. Angular contact members 56 and 57 each have one leg secured to the terminal block 50 in the slot 53 with the other leg extending substantially at right angles to the upper surface of the terminal block and having a centrally disposed slot 58. The first mentioned leg of each contact member 56 and 57 is provided with an aperture 59 which registers with the apertures 54 and 55. The outer cylindrical surface of the terminal block 50 is threaded as indicated at 60. Suitable electrical conducting means are provided to connect the terminals of the upper and lower terminal blocks and to conduct current through the woven floor covering without injury thereto.

As shown in Figs. 1 to 5 inclusive, the electrical conducting means comprises a pair of screws 61 and 62 having their lower ends tapered as indicated at 63, so as to readily pierce the floor covering, and an adjacent threaded portion 64 adapted to engage the threads of the threaded apertures 36 and 37 and a shank 65 of reduced diameter which is preferably covered by suitable insulating material 66 such as an enamel or "Bakelite".

A cylindrical socket member 67 is provided with oppositely disposed contact members 68 and 69 which are adapted to be brought into contact with the contact members 56 and 57 of the upper terminal block 50 and secured thereto by means of screws 70 and 71. The socket member is further provided with T-shaped slots or openings 72 and 73 which extend through the upper surface thereof. The sockets 67 may be of any convenient diameter but is preferably of a slightly smaller outside diameter than the diameter of the threaded cylindrical portion 60 of the upper terminal block 50. It will be understood that the contact members 68 and 69 may be of any suitable configuration to afford contacts with members inserted into the slots 72 and 73 of the socket 67. A thimble 74 having an annular flange 75 extending outwardly from the lower portion thereof is provided with internal threads 76 also at the lower portion thereof which are adapted to engage the threads 60 of the upper terminal block 50. The height of the thimble 74 is such that when the thimble is turned down more or less tightly against the rug the upper edge of the thimble will be approximately flush with the upper surface of the socket member 67. A set screw 77 is provided in the lower portion of the thimble to retain it in position. Current is conducted from the contact members in the socket 67 to the apparatus or equipment to be supplied with electricity through a plug 78 having suitable contact members which engage the contact members 68 and 69 of the socket 67.

The outlet is assembled as indicated in Fig. 5 of the drawings. Assuming that the duct 22 carrying the cable 26 and the insert 24 have been previously laid in the floor with the upper edge of the insert 24 approximately level with the surface of the floor 23, the disc which normally closes the upper end of an insert of this character is removed and the lower terminal block 28 is threaded into the insert 24 until the flange 40 is in contact with the shoulder 41 of the insert. The wires 27 of the cable 26 are then spliced or otherwise connected to the wires 38 and 39 which are connected at their upper ends to the terminals 30 and 31 by means of the screws 33. The dowels 47 and 48 are then threaded into the sockets 34 and 35 until the upper ends of these dowels project the desired height above the floor level which will normally be just above the pile of the covering 49 when laid on the floor. The insulating disc 42 is then laid on the upper surface of the block 28 with the dowels 47 and 48 extending through the dowel apertures 43 and 44. The covering is then laid on the floor and the pointed ends of the dowels pierce the covering and appear above the pile thereof. The upper terminal block 50 is then placed on the covering with the upper ends of the dowels 47 and 48 extending into the apertures 51 and 52 of the block 50. With this arrangement the apertures 36 and 37 are brought into alignment with the apertures 54 and 55 of the upper terminal block 50 so that no difficulty will be encountered in making the necessary electrical connection between the terminals of the lower and upper terminal blocks by means of the screws 61 and 62 which are inserted into the apertures 54 and 55 respectively, and pushed through the floor covering and threaded into the apertures 36 and 37 respectively. The screws 61 and 62 are turned down to the desired extent to maintain the upper terminal block 50 in the desired position. The socket 67 is then placed on the terminal block 50 so that the shanks of the screws 71 are received in the slots 58 of the contact members 56 and 57, after which the screws 71 are turned up tight to provide contact between the terminals 56 and 68 and 57 and 69. The thimble 74 is then placed over the socket 67 and is threaded on to the upper terminal block 50 and after being turned down to the desired extent is set in position by means of the set screw 77. The plug 78 is then inserted in the socket 67 and the current is thus transmitted from the cable 26 in the duct 22 to the electrical apparatus or equipment above the floor level.

With this arrangement it will be perceived that electrical current is transmitted from a point below the floor level through the woven covering on the floor to the electrical consuming equipment without in any way injuring or damaging the floor covering. The dowels 46 and 47 and the screws 61 and 62 may be made small enough so as to pierce the covering without any injury whatsoever thereto. The outlet is readily and quickly assembled and by the use of the locating dowels 47 and 48, the terminals of the upper and lower terminal blocks are brought into accurate alignment so that no difficulty is encountered in quickly connecting them both electrically and physically. Although in the form of the invention shown in Figs. 1 to 5 inclusive, both a terminal block 50 and a superposed socket 67 are utilized, it will be understood that these two members may be combined in a single member if desired, so as to provide a contact member of any desired height above the floor level. The outlet lies close to the floor level and presents a pleasing appearance.

In lieu of using two spaced dowels, as shown in Figs. 1 to 5 inclusive, for locating the terminals in the lower terminal block and for bringing the terminals in the lower and upper terminal blocks into accurate alignment, a single centrally located dowel, such as shown in Figs. 6 and 7, may be utilized if desired. Referring to Figs. 6 and 7, the lower terminal block designated 80 is provided with an outwardly extending flange 81 which is adapted to rest against the shoulder 82 of the insert 83 when the block 80 is positioned in the insert. Suitable threaded means such as the screws 84 shown, secure the block 80 to the insert. Terminals 85 and 86 are secured to the lower portion of the block 80, as shown, and are connected to the wires 38 and 39 by means of suitable screws 33. The terminals 85 and 86 are provided with threaded apertures similar to the apertures 36 and 37 in the terminals 30 and 31 shown in Figs. 1 to 5 inclusive, and apertures 87 and 88 in the terminal block 80 register with these apertures. Block 80 is provided with a centrally disposed upwardly extending dowel 89 provided with a tapered upper end and with a longitudinally extending V-shaped notch 90 extending from the upper end of the dowel to approximately the upper surface of the terminal block 80. The dowel is secured to the terminal block 80 by any suitable means such as the screw 91, shown. An upper terminal block 92 is provided with a centrally disposed socket 93 having a longitudinally extending V-shaped key or ridge 94 projecting from the inner cylindrical wall of the socket and which is adapted to be received in the slot or key way 90 in the dowel 89. The socket 93 may or may not, as desired, extend entirely through the upper terminal block 92. The dowel 89 is fixed in position on the lower terminal block 80 by any suitable means such as indicated at 95 so that the notch or key way 90 is maintained in a definite position with respect to the apertures in the terminals 85 and 86 and the socket 93 is fixed in the upper terminal block 92 by any convenient means, as by the flanges 96 on the socket so that the key or ridge 94 bears the same definite relation with respect to the position of the terminals 56 and 57 as the terminals 85 and 86 bear to the notch 90 in the dowel 89 in order that when the upper terminal block 92 is placed in position with the key 94 registering with the key way 90, the terminals 85 and 86 in the lower terminal block 80 and the terminals 56 and 57 of the upper terminal block 92 are in accurate alignment. Accordingly, when the screws 61 and 62 are inserted in the apertures 54 and 55 of the upper terminal block and are pushed through the covering 49, they readily enter the apertures in the terminals 85 and 86 of the lower terminal block and may be quickly threaded thereinto, thus providing the required electrical connection between the upper and lower terminal blocks as has been previously described in connection with the form of invention shown in Figs. 1 to 5 inclusive. Obviously, an insulating disc similar to disc 42 shown in Figs. 1 to 5 may be employed in the form of the invention shown in Figs. 6 and 7, if desired.

In the form of the invention shown in Figs. 8 and 9 a single centrally located dowel is utilized for not only locating the lower terminal block and the terminals thereon but is in addition utilized to secure the upper and lower terminal blocks together. Referring to these figures, the lower terminal block 97 has a dowel 98 which is threaded at both ends and is provided with a collar 99 between the threaded portion thereof. The upper end of the dowel is tapered so as to permit it to readily pierce the woven floor covering and the lower end is threaded into a socket 100 disposed centrally of the lower terminal block 97. In this form of the invention the lower terminal block is provided with annular contacts concentrically disposed with respect to the dowel 98 and with each other. The inner annular contact is designated 101 and the outer annular contact is designated 102. These contacts may be of any suitable construction and are provided with screws 103 which serve to connect the wires 39 and 38 to the contact members 101 and 102 respectively. The upper terminal block 104 is provided with an axially disposed socket 105 which is internally threaded to receive the upper threaded end of the dowel 98. The block 104 also has a longitudinally extending aperture 106 which is at a radial distance from the socket 105 equal to the radius of the annular contact 101 and also has a longitudinally extending aperture 107 which is disposed at a radial distance from the socket 105 equal to the radius of the annular contact member 102. Contact members 108 and 109, similar to the contacts 56 and 57, are mounted on the upper surface of the terminal block 104 with the apertures in the horizontally extending portions thereof in alignment with the apertures 106 and 107. Screws 110 and 111 having their upper shank portions threaded to engage corresponding threaded portions of the contact members 108 and 109 and with their lower portions of a somewhat reduced diameter and covered with a suitable insulating material such as enamel or "Bakelite" and with their end portions pointed or tapered, as shown, to permit them to be readily forced through the rug or carpeting on the floor, are utilized to effect electrical connection between the contacts of the upper and lower terminal blocks. Lock nuts 112 may be utilized, if desired, to maintain the screws 110 and 111 in the desired position. With this arrangement, after the lower terminal block 97 has been placed in position in the insert 83 and the wires 38 and 39 have been connected to the annular contact members 101 and 102, the rug or carpeting is placed on the floor and the dowel 105 pierces the rug and extends above the pile thereof. The upper terminal block 104 is then threaded on to the dowel 105 until the block 104 bears more or less snugly against the rug 49, after which the screws 110 and 111 are inserted in their respective sockets in the upper terminal block and are turned down until the lower ends theerof have pierced the rug 49 and have come into contact with members 101 and 102 thus making the necessary electrical connection through the rug between the upper and lower terminal blocks. In this embodiment, it will be seen that the dowel provides the means for physically securing the upper and lower terminal blocks together while the screws 110 and 111 merely serve to transmit the electrical current through the rug between the terminals in the upper and lower terminal blocks.

In the form of the invention shown in Fig. 10, a single dowel is utilized for the terminal locating means and the means for securing the terminal blocks together in addition to carrying current. The lower terminal block 115 is provided with an aperture 116 in the base 117 thereof, through which the wires 38 and 39 are inserted. A small diameter dowel 118 is centrally disposed with respect to the block 115 and is secured thereto by any suitable means such as by being threaded into an electrical conducting block 119 secured to the base 117, as shown. The upper end of the dowel is tapered or pointed as indicated at 120 to facilitate the piercing of the rug or other floor covering. Wire 38 is electrically connected to the block 119 by means of screw 121 and wire 39 is connected to electrical conducting block 122 or to the contact member 123 secured to block 122. The upper terminal block 124 has a contact member 125 provided with an aperture which receives the upper end of the dowel 118 and an electrical connection is made with the dowel by means of a nut 126 threaded on the upper end of the dowel into contact with the member 125. The central portion of the dowel 118 is provided with a layer of insulating material such as enamel or "Bakelite" 127 and a metallic or other electrical conducting sleeve 128 is placed over the insulating material 127. A second layer or tube of insulating material 129 is disposed over the sleeve 128 to insulate the latter from the rug and the upper and lower terminal blocks. Contact member 123 is arranged to contact the sleeve 128 adjacent its lower end and contact member 130 on the upper block 124 is arranged to contact the upper end of the sleeve 128. A contact 131 similar to the contacts 56 or 57 may carry the current from the contact 125 to a socket such as the socket 67. An insulating disc 132 is disposed over the lower terminal block 115. With this embodiment the current is carried through the dowel from wire 38 to the contact member 131 and through the insulated sleeve 128 from wire 39 to the contact 130. In Fig. 10, for the sake of clarity, the dowel, the sleeve 128 and the insulation for the dowel and sleeve have been shown on a somewhat enlarged scale, but it will be understood that these parts may be made as small in diameter as desired so as to obviate injury to the rug or other floor covering.

In the form of the invention shown in Figs. 11 and 12, two spaced dowels similar to the dowels 47 and 48 are employed to locate the lower terminal block and the terminals thereon, but a single means, similar in general to the current carrying means shown in Fig. 10, is utilized to carry the current. As shown in Figs. 11 and 12, the lower terminal block 135 is provided with spaced dowels 136 and 137 which may be detachably secured to the block 135. These dowels are similar in all respects to the dowels 47 and 48, shown in Figs. 1 to 5 inclusive. Wire 38 is secured to one end of an arcuate contact member 138 by means of a screw 139, the other end 140 of which is centrally disposed with respect to the lower terminal block 135 and as shown is provided with a threaded aperture adapted to receive the lower threaded end 141 of a screw 142 having a head 143. The lower end of screw 142 is tapered or pointed as indicated at 144 to permit the screw to readily pierce the floor covering. The wire 39 is connected to one end of an arcuate contact member 145 by means of a screw 146, the other end 147 of which is provided with an upstanding portion 148. The shank of screw 142 is provided with a layer, coat or sleeve 149 of insulating material, such as enamel or "Bakelite", which extends from the threaded portion 141 of the shank to the head 143 and under the entire surface of the head 143 as indicated at 150. A metallic or other electrical conducting sleeve 151 is placed over the layer of insulating material 149 and the sleeve 151 is provided at its upper end as shown in Fig. 12, with an annular flange 152 which is insulated from the head 143 of the screw 142 by the insulating material 150. A layer or sleeve 153 of insulating material is disposed over the greater portion of the sleeve 151 in order to insulate the latter from the floor covering and the upper and lower terminal blocks. The upstanding portion 148 of arcuate contact 145 engages the lower end of sleeve 151, as clearly indicated in Figs. 11 and 12. The upper terminal block 154 is provided with a pair of longitudinally extending apertures 155 and 156 which are adapted to receive the upper ends of the dowels 136 and 137 and is further provided with a centrally disposed aperture 157 which is large enough in diameter to receive the screw 142 together with the sleeve 151 and the insulating material thereon. A contact member 158 is secured to the upper surface of the terminal block 154 and is provided with a portion 159 which is adapted to contact with the head 143 of the screw 142. A contact member 160 is also secured to the upper surface of the terminal block 154 and is provided with an aperture which is adapted to receive the sleeve 151 on screw 142 and to contact with the flange 152 of the sleeve 151 when the outlet is assembled and the screw 142 is turned down in position. The contact members 158 and 160 may be provided with slots similar to the slots 58 in the contact members 56 and 57, shown in Figs. 1 to 5 inclusive, to accommodate the terminals of a socket member such as socket 67. An insulating disc 161 of suitable material and with apertures of suitable size and location, is disposed over the lower terminal block 135. With this form of the invention the dowels 136 and 137 project above the pile of the covering 49 and serve to accurately locate the lower terminal block 135. The screw 142 and the sleeve 151 mounted thereon serve to conduct the electrical current from the lower terminal block through the rug or other woven floor covering to the contact members 158 and 160 on the upper terminal block. The current is conducted from wire 38 through the screw 142 to the contact 158 and from wire 39 through the sleeve 151 to the contact 160. For clarity of illustration, the screw 142, sleeve 151 and the insulating material therefor have been shown on a relatively enlarged scale, but these parts may, of course, be made of any size small enough to prevent injury to the floor covering.

As illustrated in Fig. 13, two spaced dowels are utilized not only for locating the lower terminal block but also for conducting the current through the floor covering. These dowels are also utilized to aid in securing the upper and lower terminal blocks together. As shown in 75

Fig. 13, the lower terminal block 162 is provided with a central aperture 163 through which the wires 38 and 39 are passed. Wire 38 is connected to a metallic or other electrical conducting terminal 164 secured to the block 162 and wire 39 is connected to a similar terminal 165 also secured to the block 162. A dowel 166 is secured at its lower end in any suitable manner to the terminal 164 and a dowel 167 is also secured at its lower end to the terminal 165. Both dowels extend upwardly from or at right angles to the terminal block 162 and each is provided with an insulating sleeve or layer of material, such as enamel or "Bakelite", designated 168. The upper ends of both dowels are tapered or pointed as indicated at 169 to facilitate their piercing the woven floor covering 49. An upper terminal block 170 is provided with longitudinally extending apertures 171 which are adapted to receive the dowels 166 and 167. A contact member 172 is secured to the upper surface of the terminal block 170 and is provided with an aperture adapted to receive the upper end of the dowel 166 as shown, and is electrically connected therewith by means of a nut 173 or other suitable means. A contact member 174 is likewise secured to the upper surface of the terminal block 170 and is also provided with an aperture which is adapted to receive the upper end portion of the dowel 167 and is electrically connected thereto by means of a nut 175 or other means. The contacts 172 and 174 may be provided with slots similar to the slots 58 in the contacts 56 and 57, shown in Figs. 1 to 5 inclusive, for electrical connection with a socket member, such as socket 67. A disc 176 of suitable insulating material provided with apertures to receive the dowels 166 and 167 is positioned over the lower terminal block 162.

In the form of the invention shown in Figs. 14 and 15 no means are provided for piercing the rug or other woven floor covering to locate the lower terminal block or the terminals thereon. With the arrangement disclosed in these figures the terminals are located either by measuring or by electrical or electro-magnetic means which are well known in the art or by any other suitable means. Referring to Figs. 14 and 15, the lower terminal block 180 is provided with a terminal 181 having a threaded aperture and another terminal 182 also having a threaded aperture. The terminal block 180 is provided with longitudinally extending apertures 183 which register with the threaded apertures in the terminals 181 and 182. Wire 38 is connected to the terminal 181 by suitable means and wire 39 is likewise connected to the terminal 182. The upper terminal block 184 has a pair of longitudinally extending apertures 191 which are disposed so as to register with apertures in the terminals 181 and 182. Contacts 185 and 186 are secured to the upper surface of the terminal block 184 and the leg of each contact which engages the block 184 is provided with an aperture which registers with the apertures 191. A screw 187 having its shank insulated as indicated at 188 serves to connect the terminal 181 with the terminal 185 and a screw 189 having its shank insulated as indicated at 190 is adapted to electrically connect the terminal 182 with terminal 186. With this arrangement it will be perceived that when the terminals 181 and 182 are more or less accurately located by measuring or by electrical or electro-magnetic means, the upper terminal block 184 may be placed on the rug over the lower terminal block 180 and the screws 187 and 189 may be inserted in the apertures 191 and forced through the rug and threaded into terminals 181 and 182 thereby electrically connecting the upper and lower terminal blocks.

In all of the embodiments of the invention hereby disclosed it will be perceived that the electric current is transmitted through the floor covering without the necessity of injury to the covering.

Although the invention has been illustrated and described as being particularly well adapted for use with woven floor coverings such as rugs or carpeting, it will be understood that it may be effectively utilized with other types or kinds of floor coverings as well, such for example as linoleum or the like. The expressions "woven floor covering", "woven covering" or "covering" as used herein or in the claims hereto appended are intended to include linoleum and the like as well as rugs, carpets and the like. In all forms of the invention disclosed, the means for physically securing the upper and lower terminal blocks or the terminals thereon together, may be dispensed with if desired.

Where dowels or other means are employed to locate the terminals below the floor covering, such dowels or other means may be removed after the terminals below the covering have been located and current carrying members may be substituted therefor to provide three or four-way circuits or to provide more than two terminals above the floor level. The additional terminals both above and below the floor level will, of course, be suitably insulated from each other and from the other terminals and equipment.

Inasmuch as many variations in the forms of the invention herein disclosed may be made without departing from the principle of the invention, and because one or more features of one form herein disclosed may be utilized with one or more features of another form, no intention is entertained to limit the invention except by the scope of the appended claims.

What is claimed is:

1. An outlet providing terminals above a covering electrically connected therethrough to conductors below the covering without substantial injury to the covering, including a lower member comprising terminals disposed on an insulating body and arranged for connection to the conductors, terminal locating means removably secured to said lower member and arranged to extend through the covering without substantial injury thereto, said locating means being removable from the upper portion of said member, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals.

2. An outlet providing terminals above a covering electrically connected therethrough to conductors below the covering without substantial injury to the covering, including a lower member comprising terminals disposed on an insulating body and arranged for connection to the conductors, terminal locating means removably secured to said lower member and arranged to extend through the covering without substantial injury thereto, said locating means being removable from the upper portion of said member, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals, the arrangement being such that the upper and lower members are secured together.

3. An outlet providing terminals above a covering electrically connected therethrough to conductors below the covering without substantial injury to the covering, including a lower member comprising terminals disposed on an insulating body and arranged for connection to the conductors, terminal locating means removably secured to said lower member and arranged to extend through the covering without substantial injury thereto, said locating means being removable from the upper portion of said member, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals, the arrangement being such that the upper and lower members are secured together in spaced relationship.

4. An outlet providing terminals above a covering electrically connected therethrough to conductors below the covering without substantial injury to the covering, including a lower member comprising terminals disposed on an insulating body and arranged for connection to the conductors, terminal locating means comprising spaced dowels removably secured to said lower member and arranged to extend through the covering without substantial injury thereto, said locating means being removable from the upper portion of said member, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals.

5. An outlet providing terminals above a covering electrically connected therethrough to conductors below the covering without substantial injury to the covering, including a lower member comprising terminals disposed on an insulating body and arranged for connection to the conductors, terminal locating means consisting of a dowel removably secured to said lower member and arranged to extend through the covering without substantial injury thereto, said locating means being removable from the upper portion of said member, an upper member comprising terminals disposed on an insulating body, said dowel and upper member having portions which register with each other to thereby locate the upper terminals substantially directly above the lower terminals, and means for extending through the covering without substantial injury thereto to electrically connect the upper and lower terminals.

6. An outlet providing terminals above a covering electrically connected therethrough to conductors below the covering without substantial injury to the covering, including a lower member comprising annular terminals disposed on an insulating body and arranged for connection to the conductors, terminal locating means removably secured to said lower member and arranged to extend through the covering without substantial injury thereto, said locating means being removable from the upper portion of said member, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals.

7. An outlet providing terminals above a covering electrically connected therethrough to conductors below the covering without substantial injury to the covering, including a lower member comprising terminals disposed on an insulating body and arranged for connection to the conductors, terminal locating means secured to said lower member and arranged to extend through the covering without substantial injury thereto, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals, said last mentioned means having a threaded portion for engagement with one of said members for securing said members together.

8. An outlet providing terminals above a covering electrically connected therethrough to conductors below the covering without substantial injury to the covering, including a lower member comprising terminals disposed on an insulating body and arranged for connection to the conductors, terminal locating means comprising a dowel secured to said lower member and arranged to extend through the covering without substantial injury thereto, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals, the dowel and the upper member having cooperating threaded parts for securing together the upper and lower members in spaced relationship.

9. An outlet providing terminals above a covering electrically connected therethrough to conductors below the covering without substantial injury to the covering, including a lower member comprising arcuate terminals disposed on an insulating body and arranged for connection to the conductors, terminal locating means removably secured to said lower member and arranged to extend through the covering without substantial injury thereto, said locating means being removable from the upper portion of said member, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals.

10. An outlet providing terminals above a covering electrically connected therethrough to conductors below the covering without substantial injury to the covering, including a lower member comprising terminals disposed on an insulating body and arranged for connection to the conductors, terminal locating means removably secured to said lower member and arranged to extend through the covering without substantial injury thereto, said locating means being removable from the upper portion of said member, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals, the arrangement being such that the upper and lower members are secured together and maintained in spaced relationship.

11. An outlet providing terminals above a covering electrically connected therethrough to conductors below the covering without substantial injury to the covering, including a lower member comprising terminals disposed on an insulating body and arranged for connection to the conductors, terminal locating means comprising spaced dowels removably secured to said lower member and arranged to extend through the covering without substantial injury thereto, said locating means being removable from the upper portion of said member, an upper member comprising terminals disposed on an insulating body and having means for cooperating with the locating means to permit the disposition of the terminals on the upper member above the terminals on the lower member, and means for extending through the covering without substantial injury thereto to electrically connect the upper and lower terminals, said last mentioned means being arranged for securement to one of said members.

12. An outlet providing terminals above a covering electrically connected therethrough to conductors below the covering without substantial injury to the covering, including a lower member comprising terminals disposed on an insulating body and arranged for connection to the conductors, terminal locating means comprising a dowel removably secured to said lower member and arranged to extend through the covering without substantial injury thereto, said locating means being removable from the upper portion of said member, an upper member comprising terminals disposed on an insulating body, said dowel and upper member having portions which register with each other to thereby locate the upper terminals substantially directly above the lower terminals, and means for extending through the covering without substantial injury thereto to electrically connect the upper and lower terminals, said last mentioned means being arranged for securement to one of said members.

13. An outlet providing terminals above a covering electrically connected therethrough to conductors below the covering without substantial injury to the covering, including a lower member comprising annular terminals disposed on an insulating body and arranged for connection to the conductors, terminal locating means comprising a dowel removably secured to said lower member and disposed substantially centrally of the annular terminals and arranged to extend through the covering without substantial injury thereto, said locating means being removable from the upper portion of said member, an upper member comprising terminals disposed on an insulating body, the dowel and the upper member having cooperating threaded parts for securing together the upper and lower members in spaced relationship and to permit the disposition of the upper terminals above the lower terminals, and means for extending through the covering without substantial injury thereto to electrically connect the upper and lower terminals, said last mentioned means being arranged for securement to one of said members.

HENRY FERGUSON RICHARDSON.